United States Patent [19]

Mazelsky

[11] 3,708,181
[45] Jan. 2, 1973

[54] CONSTRUCTION FOR SAFETY AIR CUSHION SYSTEM

[75] Inventor: Bernard Mazelsky, West Covina, Calif.

[73] Assignee: ARA, Inc., West Covina, Calif.

[22] Filed: Aug. 19, 1970

[21] Appl. No.: 65,019

[52] U.S. Cl. ..............280/150 AB, 220/23.4, 222/3
[51] Int. Cl. ..............................................B60r 21/08
[58] Field of Search ...280/150 AB; 220/85, 72, 23.4; 222/3, 85

[56] References Cited

UNITED STATES PATENTS

| | | | |
|---|---|---|---|
| 3,429,583 | 2/1969 | Martin et al. | 280/150 |
| 2,813,664 | 11/1957 | Punte | 220/85 |
| 3,231,152 | 1/1966 | McKiever | 222/394 |
| 3,514,124 | 5/1970 | Richardson | 280/150 |
| 3,588,142 | 6/1971 | Gorman | 280/150 |
| 3,425,586 | 2/1969 | Petters et al. | 220/23.4 |
| 2,834,606 | 5/1958 | Bertrand | 280/150 |
| 2,944,701 | 7/1960 | Hatanaka | 222/3 X |

Primary Examiner—Kenneth H. Betts
Attorney—Herzig and Walsh

[57] ABSTRACT

The invention is an improvement in inflatable air cushion systems for use as devices to protect passengers in vehicles. Pressure is transferred from an elongated gas container through a nozzle to an inflatable bag or envelope for inflating it. Openings are formed for transferring gas from the container through the nozzle by means of an explosive charge. The improvements of the herein invention reside in that the gas container and transfer means or nozzle are fabricated as separate parts. Spaced openings are provided in the nozzle along its length with solid portions or ribs between the openings. These openings are in the nozzle rather than in part of the elongated tank. The elongated tank and the nozzle are formed as extrusions. These parts are joined together by way of tongue and groove joints that form a strong joint preventing failure of the tank resulting from pressure.

15 Claims, 8 Drawing Figures

INVENTOR.
BERNARD MAZELSKY
BY Herzig & Walsh
ATTORNEYS

INVENTOR.
BERNARD MAZELSKY
BY Herzig & Walsh
ATTORNEYS

CONSTRUCTION FOR SAFETY AIR CUSHION SYSTEM

SUMMARY OF THE INVENTION

The invention is directed to improvements in inflatable safety air cushion systems of the type adapted for use in vehicles to protect passengers in the event of accidents.

A system of this type is disclosed in the application of the herein inventor, Ser. No. 885,601 filed on Dec. 16, 1969. In a system of the prior application, an elongated tank is provided with elongated transfer means in the form of a nozzle for transferring gas from the tank to the inflatable bag or envelope. A relatively thin diaphragm is formed in the tank which is ruptured or opened by an explosive charge for transferring gas to the inflatable envelope. The herein invention embraces improvements in the construction in the manner of fabrication of the tank and the nozzle assembly. In the device of the application referred to, the explosive charge produces openings in the diaphragm along the length of the elongated container, that is spaced openings with ribs or solid portions between them. Such ribs are required for the necessary strength of the tank or pressure vessel.

In the improved construction of the herein invention, the elongated tank and transfer means or nozzle are formed as separate parts and then joined by tongue and groove joints. The transfer means or nozzle has a part which is jointed to the tank which part itself is provided with spaced, elongated openings with solid portions or ribs between them.

The tank and nozzle are joined in such a way as described in detail herein, that the ribs serve the same purpose as if they were in the tank, as previously constructed. Preferably the tank and the transfer nozzle are formed as extrusions joined together by tongue and groove joint. The joint is of nature to serve the particular purposes described herein.

In the preferred, exemplary form of the invention as described herein, both the tank and the transfer nozzle have tongues and both these elements have grooves which interfit together by way of relative, axial sliding movement of the two parts. A further improvement resides in the removal of material from the rupturable diaphragm at spaced points adjacent to the explosive charge, whereby the effect of the charge is enhanced by providing an accurate "stand-off" distance between the linear shaped charge and the diaphragm section which is to be ruptured.

The improvements as referred to are important from the standpoint of facilitating fabrication and construction; from the standpoint of strength of the parts; and from the standpoint of economy. A primary objective of the invention is to realize these improved characteristics in the construction. The elongated tank and transfer nozzle are preferably in the form of extrusions which facilitates fabrication and production. The tongue and groove joint between the parts as described enhances the strength, particularly with respect to the tank, in the area adjacent to the rupturable diaphragm and prevents the tank from spreading at that area. The realization of this additional strength is a further object of this invention.

BRIEF DESCRIPTION OF THE DRAWINGS

Further objects and additional advantages of the invention will become apparent from the following detailed description and annexed drawings wherein.

DESCRIPTION OF THE PREFERRED EMBODIMENT

Figure 1:
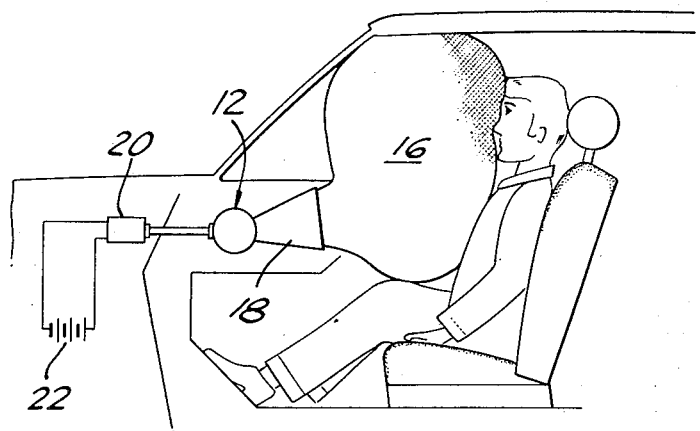
FIG. 1 is a pictorial view showing the installed position of the safety inflatable air cushion device in a vehicle.
Figure 2:
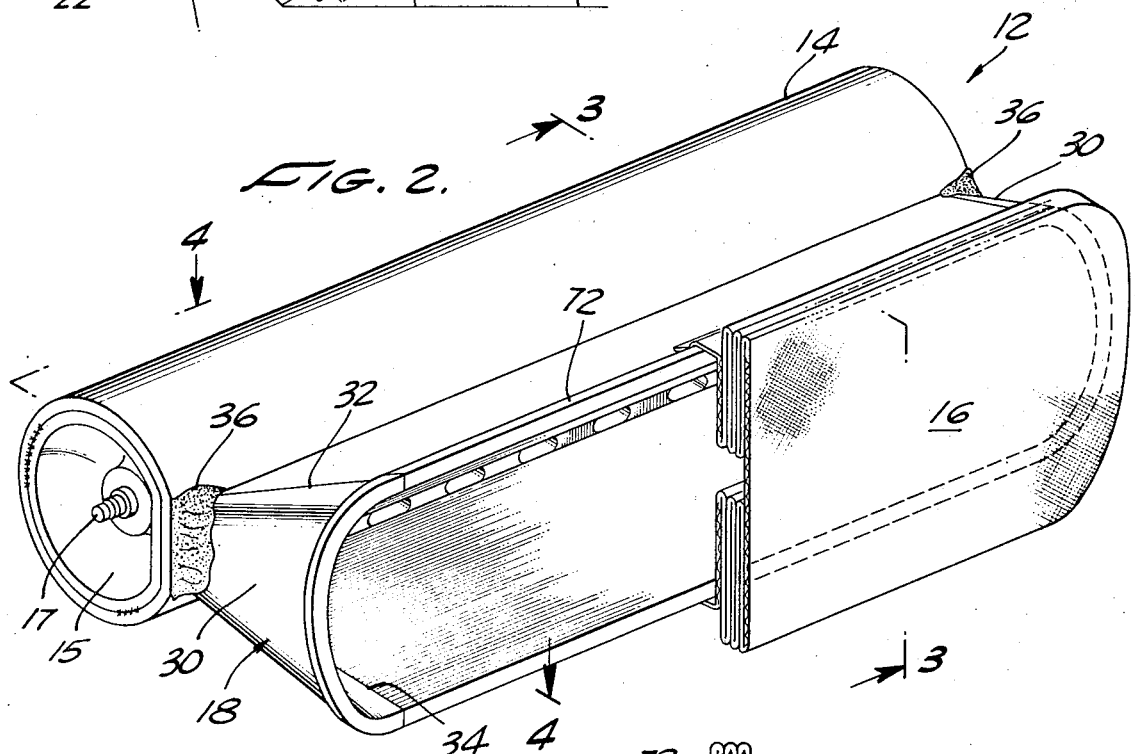
FIG. 2 is a perspective view, partly broken away, of the improved construction of the invention.

FIG. 1 illustrates a typical installation illustrating a safety device or system as indicated at 12. Upon being activated, the device inflates to a position as illustrated in FIG. 1. As shown in FIG. 2, the gas container 14 of the device is cylindrical, the bag 16 normally being folded or collapsed as shown with the diffuser nozzle 18 between the container and the folded bag. The arrangement as shown is preferable to arrangements wherein the gas container is within the bag itself.

The system is controlled by a deceleration responsive sensor that may be mounted in a position ahead of the firewall as shown whereby to respond rapidly to deceleration forces when the vehicle enters an impact situation. Sensor 20 may be of a conventional or typical type energizable by way of battery 22.

FIG. 1 shows the bag 16 inflated in a position in front of the passenger. The bag, of course, may have a transverse dimension sufficient to provide safety for one or more passengers in the front seat.

FIGS. 2, 3, 4, and 5 show a preferred arrangement of the parts. The diffuser nozzle 18 has a rear part 26, the diffuser diverging as shown to the bag 16. as may be seen, the tank or container 14 is elongated as is the diffuser nozzle 18 extending along the length of the bag 16. The gas container and diffuser nozzle can of course be made to be less than or coextensive in length with the bag. Tank 14 is cylindrical having welded hemispherical ends as shown at 15 for maximum strength. The ends are concave as shown. Numeral 17 designates a threaded fitting in the end or head 15.

Figure 3:
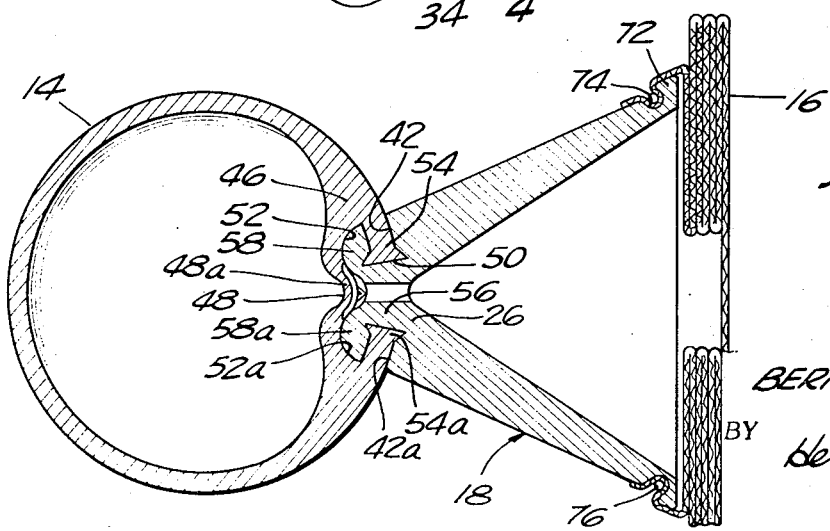
FIG. 3 is section view taken along the line 3—3 of FIG. 2.
Figure 4:
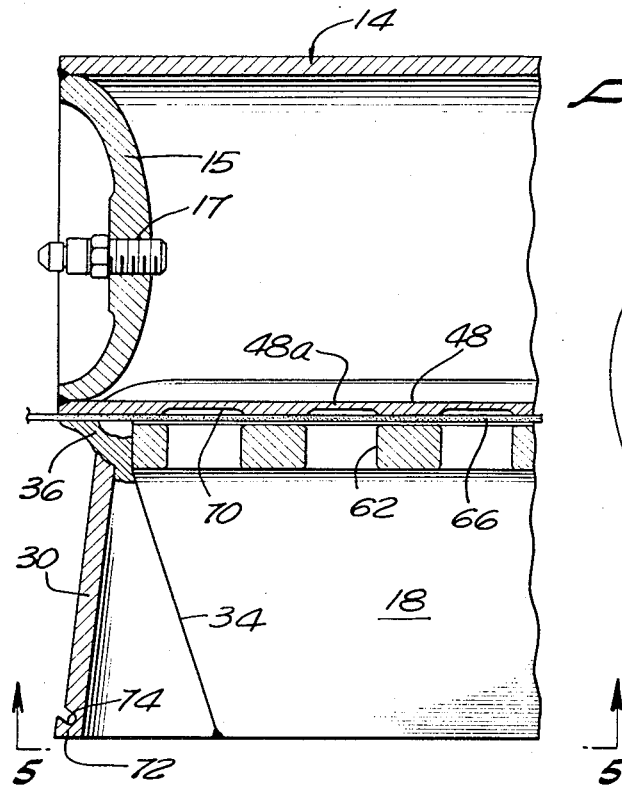
FIG. 4 is a cross sectional view taken along the line 4—4 of FIG. 2.
Figure 6:
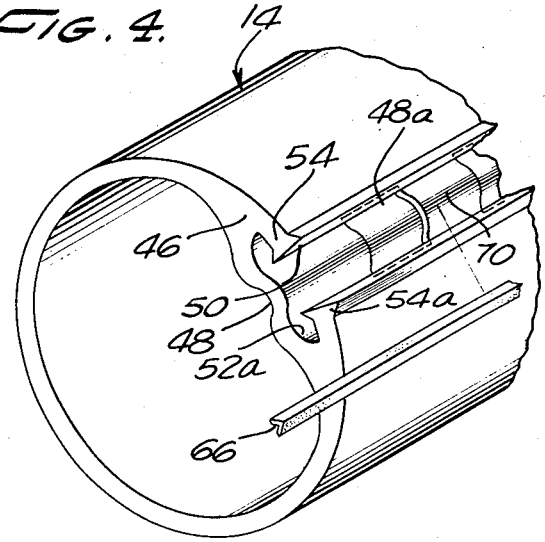
FIG. 6 is perspective view of the tank showing the rupturable membrane.
Figure 5:
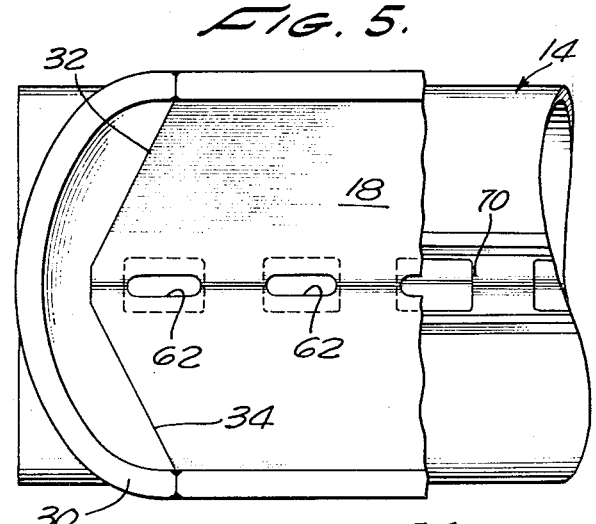
FIG. 5 is a view taken along the line 5—5 of FIG. 4 illustrating the opening means in greater detail.
Figure 7:
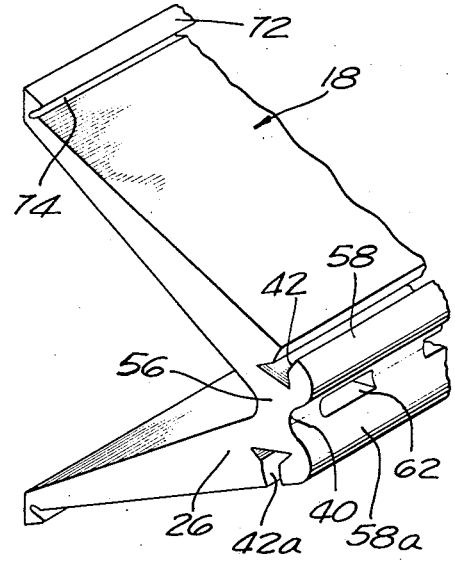
FIG. 7 is a detail, perspective view of the nozzle.

The tank 14 and the nozzle 18 are fabricated as separate parts and in the preferred form of the invention, the parts as shown in FIG. 3 are extrusions formed of suitable material for the purpose. The use of the extrusion process in the fabrication of course facilitates production. The nozzle assembly includes two end pieces, one of which is designated by the numeral 30 in the figures. These pieces are arcuate as shown, tapering in the same manner as the main part of the nozzle and these pieces have straight edges as shown at 32 and 34 which as shown abut against end edges of the main nozzle part and may be secured to the tank 14 by welding as shown at 36 in FIG. 2.

Figure 8:
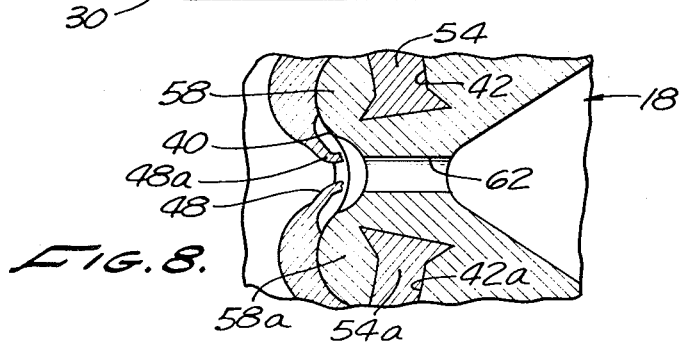
FIG. 8 is a detail view showing the membrane ruptured.

The tank 14 and the nozzle 18 are mutually configurated as may be seen in FIGS. 3 and 8 to provide a tongue and groove joint as between these parts. The joint can be made by sliding these parts relatively axially with respect to each other. It will be observed that the base part of the nozzle 18 has an inward arcuate depression as may be seen at 40. On opposite sides, it has the grooves as shown at 42 and 42a, extending along its length. Both of these grooves are dovetailed at the base part of the groove as may be seen. The tank 14 on that side on which the nozzle is joined is thickened as may be observed at 46. At the inside of the thickened portion, is an arcuate depression 48 extending along the length of the tank. The thickened portion 46 has an opening in it which includes a neck part 50 and extending side wing parts or openings as designated at 52 and 52a. The tank 14 has extending dovetailed tongues 54 and 54a which are shaped to be received and to fit into the dovetailed grooves 42 and 42a in the nozzle base 26. The nozzle 18 has a narrow neck part which is between the openings or grooves 42 and 42a as designated at 56 and extending from this narrow part are extensions or tongues as designated at 58 and 58a which are shaped to be received in the openings or grooves 52 or 52a in the tank 14. As pointed out, the joint between the tank 14 and the nozzle 18 may be formed by sliding these parts relatively to each other axially to form a joint as shown in FIGS. 3 and 8. It will be observed that the recess 48 formed in the thickened part 46 of the tank 14 comes opposite the arcuate recess 40 in the nozzle 18.

As pointed out, the nozzle 18 is formed by extrusion. After being extruded, spaced, elongated holes or openings as designated at 62 are formed in the narrow neck portion 56 of the nozzle as shown. These openings may be readily formed by means of conventional machine tools which simply punch these holes or openings in spaced positions. These openings are for the transfer or transmission of gas under pressure from the tank into the envelope for inflating as will be described. The manufacturing process is greatly facilitated by providing these openings in the nozzle member itself rather than that they be formed in the tank. The ribs between openings are imperatively necessary to provide the necessary strength.

The material of the tank at the position of the arcuate depression 48 forms a thin diaphragm of arcuate cross section as shown which is opposite the arcuate depression 40 in the nozzle 18 as previously described. An elongated shaped charge as designated at 66 is positioned along the length of the bottom of the arcuate recess 40 in the nozzle, that is, in a position along the thin diaphragm 48a formed in the thickened part 46 of the tank 14 as described. The shaped charge may be of a known commercial type marketed as Linear Shaped Charge. For best effectiveness of the shaped charge, it is desired that it be spaced slightly from the diaphragm 48a which is to be ruptured or opened by the shaped charge as shown in FIG. 8. To facilitate this purpose, surface portions of the diaphragm 48a are machined off at intervals to make these portions thinner and to space them from the shaped charge as illustrated at 70 in FIG. 4 and as may be seen in FIGS. 3, 4, 5, and 6.

The inflatable envelope or bag 16 can be made of any suitable gas impervious fabric material. Preferably, it is secured to the nozzle 18 in the manner illustrated in FIGS. 2 and 3. In the normal inactive position, it is folded as illustrated in a position adjacent to the outlet of the nozzle 18. Extending completely around the periphery of the nozzle discharge or outlet, there is formed a rib 72 which is of similar shape on the main part of the nozzle and of the arcuate end parts as shown at 30. Adjacent to this rib and extending completely around the nozzle discharge is formed a groove 74. The bag opening is of a size to fit around the periphery of the discharge part of the nozzle. Edge portions of the bag are received in the continuous, peripheral groove as shown and then they are held in the groove by a continuous, flexible resilient holding member 76 that engages in the groove holding the edge portions of the bag in position as shown.

From the foregoing, those skilled in the art will readily understand the nature and the construction of the invention and the manner in which it realizes all of the objectives as set forth in the foregoing. The construction is one particularly calculated as set forth in the foregoing to simplify fabrication, production and assembly and to at the same time improve qualities of the finished product from the standpoint of strength and economy.

Having reference to the joint between tank and the nozzle assembly, it will be observed that the parts are held firmly together. Because of the tongue and groove relationship at the joint, the pressure in the tank is prevented from spreading the thickened part of the tank assembly outwardly away from the nozzle; the tongues will not pull out of their grooves because of the dovetailed construction. Thus, inadvertent bursting at this point is avoided. Further, the assembly is strengthened because of the base of the nozzle and the tank being mutually joined by the tongue and groove joint with ribs between gas openings being in the base part of the nozzle.

The foregoing disclosure is representative of a preferred form of the invention and is to be interpreted in an illustrative rather than in a limiting sense, the invention to be accorded the full scope of the claims appended hereto.

What is claimed is:

1. In a safety device for human protection comprising an envelope inflatable with a gas whereby to form a resilient cushion and having an elongated container under pressure, with means to provide elongated passageway means along the length of the container for transferring gas from the container to the envelope for inflating it, the improvement comprising the said container and the transfer means having parts forming a dovetail type tongue and groove joint securing the container and transfer means together along the length of the container.

2. A device as in claim 1, wherein said parts are constructed to make it possible to join the parts by relative longitudinal movement along the length of the joint.

3. A device as in claim 1, wherein the parts forming the tongue and groove joint are extrusions.

4. A device as in claim 1, wherein interfitting tongues and grooves are formed on both of the parts.

5. A device as in claim 1, wherein said transfer means comprises a nozzle having a plurality of openings communicating with the container with solid portions between the openings.

6. A device as in claim 5, wherein said container has a diaphragm portion adapted to be ruptured by an explosive charge positioned to provide a gas release channel communicating with said openings in the nozzle.

7. A device as in claim 6, wherein said inflatable envelope has portions secured to the periphery of the nozzle, the nozzle periphery having a groove therein and spring retainer means engageable in the groove whereby to secure edge portions of the envelope between the spring retainer means and the nozzle.

8. A device as in claim 1, whereby said tongue and groove joint comprises tongues and grooves formed on the container and tongues and grooves formed on the transfer means, the tongues and grooves having mutually interfitting engagement.

9. A device as in claim 1, wherein the tongue and groove joint comprises interfitting tongues and grooves configurated to provide interfitting relationship whereby to prevent spreading of the parts of the container at the area of the joint.

10. In a safety device for human protection comprising an envelope inflatable with a gas whereby to form a resilient cushion and having an elongated gas container under pressure, with means to provide an elongated passageway means along the length of the container for transferring the gas from the container to the envelope for inflating it, the improvement comprising the said container and the transfer means being separately formed parts joined together along the length of the container, the transfer means comprising a nozzle having a plurality of openings communicating with the container with solid portions between the openings, the container having a rupturable area adjacent said openings.

11. A device as in claim 10, wherein said container and transfer means comprise extrusions.

12. In a safety device for human protection comprising an envelope inflatable with a gas whereby to form a resilient cushion and having an elongated gas container under pressure, with means to provide an elongated passageway means along the length of the container for transferring the gas from the container to the envelope for inflating it, the improvement comprising the said container and the transfer means being separately formed parts joined together, the transfer means comprising a nozzle having a plurality of openings communicating with the container with solid portions between the openings and a rupturable diaphragm formed in the container adjacent to said openings.

13. A device as in claim 12, including an elongated shaped charge positioned between the diaphragm and the said openings.

14. A device as in claim 13, wherein the thickness of the diaphragm opposite the openings is reduced providing a space between the diaphragm and the charge.

15. In a safety device for human protection comprising an envelope inflatable with a gas whereby to form a resilient cushion and having an elongated gas container under pressure, with means to provide an elongated passageway means along the length of the container for transferring the gas from the container to the envelope for inflating it, the improvement comprising the said container and the transfer means being separately formed parts joined together, the transfer means comprising a nozzle having a plurality of openings communicating with the container with solid portions between the openings, said nozzle comprising an intermediate part and end closures secured to the intermediate part and to the container.

* * * * *